Oct. 1, 1946. G. Z. MINTON 2,408,526
GLASS SUPPORTING SKELETON MOLD
Filed Jan. 10, 1944 2 Sheets-Sheet 2
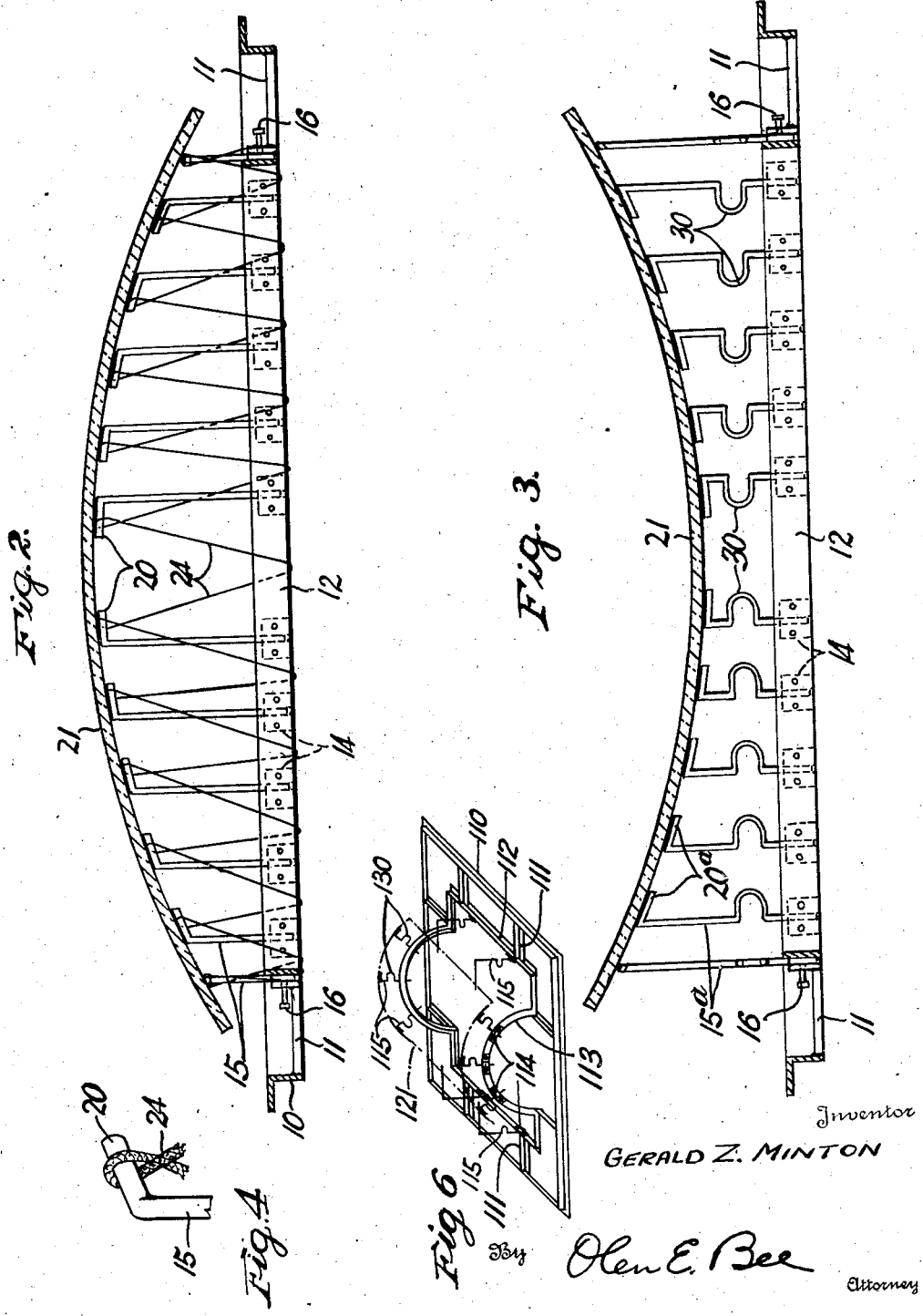

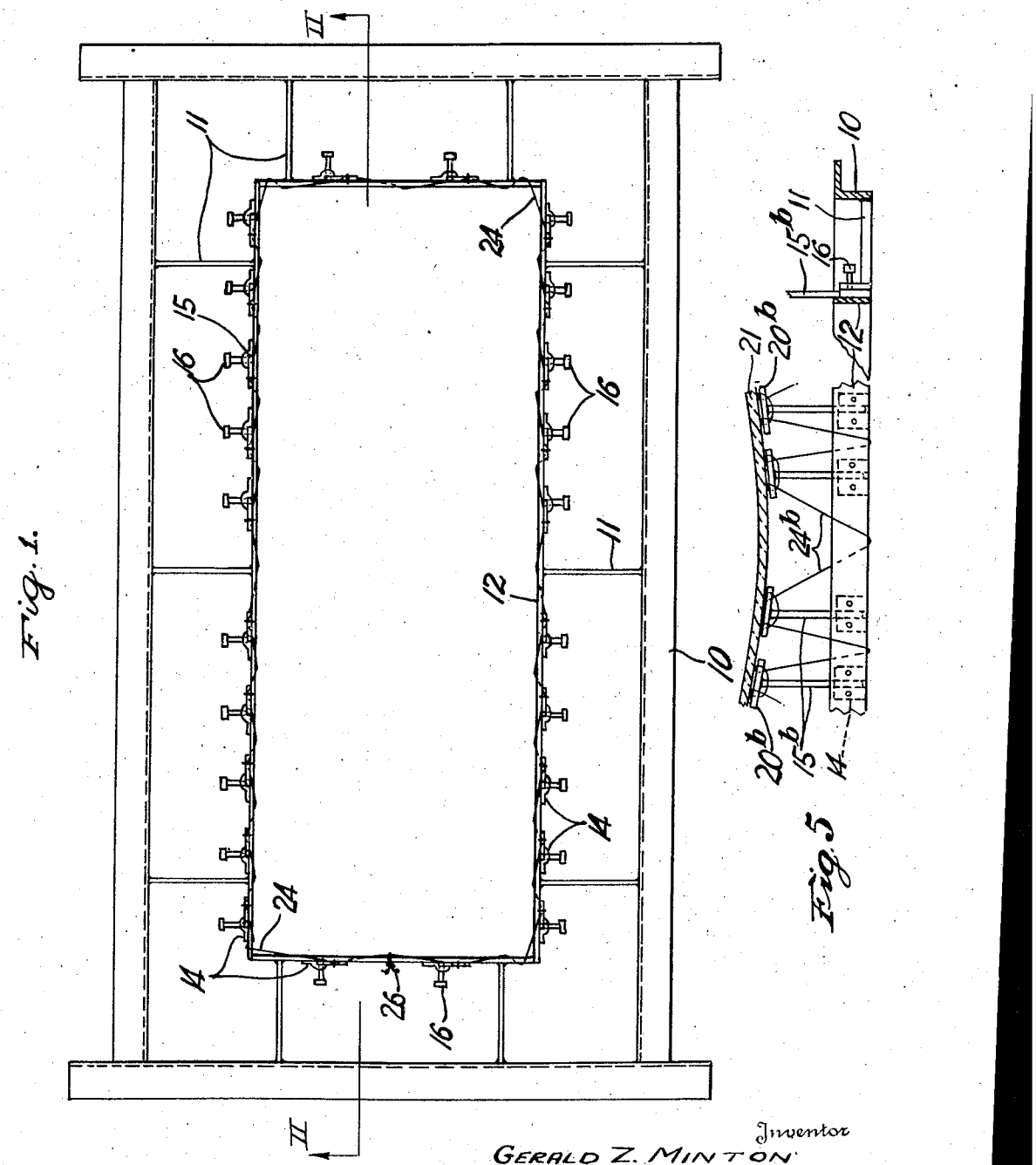

Patented Oct. 1, 1946

2,408,526

UNITED STATES PATENT OFFICE 2,408,526

GLASS SUPPORTING SKELETON MOLD

Gerald Z. Minton, Tarentum, Pa., assignor to Pittsburgh Plate Glass Company, Allegheny County, Pa., a corporation of Pennsylvania Application January 10, 1944, Serial No. 517,665

9 Claims. (Cl. 49—67)

This invention relates to supporting structures for carrying sheet glass, and it has particular relation to portable frames for supporting sheet glass in connection with heat treatment thereof preparatory to bending, annealing, or other operations.

One object of the invention is to provide an improved frame of light weight adapted to support sheet glass for bending, annealing, or other treatment incidental to the heating thereof.

Another object of the invention is to provide an improved type of glass supporting frame in which multiple supporting elements are of minimum size and of such length as to space the supported glass materially from the body of the frame to reduce strain or other undesirable marks, which otherwise might appear in the glass in connection with heat treatment thereof.

In one form of the invention relatively light horizontal frames are proposed to include very small upright supports, such as wires, disposed around the frame structure and to be so adjustable as to be capable of manipulation to various positions and thereby conform to various curvatures of glass to be bent, or to the curvature of bent glass which is to be supported thereon. Frames of this type are adapted to be transported by conveyors or otherwise into furnaces according to conventional practice, for example, according to the disclosure in U. S. Patent No. 2,021,180, issued to H. J. Galey on November 19, 1935. Since the frames are light and the wires are very small the points of support on the glass are reduced to a minimum. It has been found that the open light construction of the improved frames permits the employment of lower temperatures than those required in similar processing sheet glass when transported upon more bulky constructions. Likewise, as compared to the heavy or bulky type of frame previously known, the improved frame herein described insures more uniformity in heating and cooling the glass, as well as minimum undesirable distortion or warping and the elimination of areas of high strain.

In the drawings:

Fig. 1 is a plan of a glass supporting frame; Fig. 2 is a vertical section taken substantially along the line II—II of Fig. 1 and including sheet glass supported upon the frame; Fig. 3 is a vertical section similar to Fig. 2 and illustrating another arrangement of elements of the frame; Fig. 4 is a fragmentary perspective on a larger scale of a portion of a wire support and cord looped thereon; Fig. 5 is a fragmentary vertical section similar to Fig. 3 and illustrating a different form of support for the glass; and Fig. 6 is a diagrammatic perspective of another form of glass supporting frame.

In practicing the invention an outer metal frame 10, polygonal in form, is provided along its sides and ends with inwardly directed braces or rods 11 running horizontally to the inner metal molding frame 12 which is also polygonal. The braces 11 are welded or otherwise rigidly secured at their opposite ends to the side and end portions of the outer and inner frames 10 and 12. Metal straps 14 are rigidly secured along the sides and ends of the inner frame and have vertically disposed wires 15 mounted therein by means of set screws 16, which are threaded through the straps to engage the lower portions of the wires and to clamp them rigidly in place. The wires are in such form at their upper ends as to include angular sections 20.

As shown in Figs. 2 and 3 the wires 15 and 15a can be so adjusted in the straps 14 that the sections 20 and 20a define a curvature to which sheet glass 21 is to be bent, or the sheet glass already curved can be supported thereon and the wires adjusted to conform to the curvature of the glass. In either case, the glass is uniformly supported upon the angular sections 20 and 20a of the wires at a plurality of points of relatively small area.

In order to protect the glass from blemishes or injury which might otherwise result from direct contact with the wires, a cord or strand 24 of non-combustible material, such as asbestos, is wound around the inner frame 12 and is trained to and from the angular sections 20 around each of which the cord is looped. The glass thus rests upon the incombustible material rather than directly upon the supporting wire sections. The ends of the cord can be fastened suitably to the inner frame 12, as indicated at 26.

It is to be noted that the upright wires 15 are interchangeable and that these wires can be rearranged in the straps 14 to define, within reasonable limits, whatever type of curvature it is desired to develop for supporting the glass while it is being bent or otherwise treated. It is to be understood that each supporting section of the wire can be in the form of an angular extension defining an inverted L-shape (Figs. 2 and 3), or a similarly located section 20b can be in the form of an extension defining a T-shape (Fig. 5). Likewise, the asbestos cords 24 and 24b can be looped about the extensions one or more times as indicated in these figures.

If desired the upright wires 15a can be formed with intermediate sections 30 of horseshoe shape to provide for relatively slight linear adjustments thereof. By employing a suitable tool, such as pliers, any of the wires can be manipulated to alter its overall length. The difference in length can be effected by bending the horseshoe section 30 without materially changing the shape or position of the wire. All of these wires 15 shown in the various figures are interchangeable regardless of whether they have straight shank portions or are provided with the bendable horseshoe sections 30.

Referring to Fig. 6, an outer frame section 110 is rigidly connected by means of braces 111 to an inner frame section 112, and straps 114 adjustably support upright wires 115 on the inner frame, all of these elements corresponding substantially to the elements 10, 11, 12, 14, and 15, already described, with the exception that opposite ends of the inner frame section 112 are provided with upwardly curved sections 113 corresponding substantially to the shape of a bent sheet of glass 121 supported thereon. The wires 115 can be formed with intermediate sections 130 of horseshoe shape corresponding to the sections 30.

Frame supports of the type described above are adapted to be transported into a conventional furnace in which the glass is to be heated preparatory to bending it or for other purposes in connection with which heat treatment is involved. Furnaces of this type are well known, an example of which is shown in the Galey patent referred to above.

Although illustrative forms of the invention have been shown and described in detail it will be apparent to those skilled in the art that the invention is not so limited, but that various changes can be made therein without departing from the spirit of the invention or from the scope of the appended claims.

I claim:

1. In an openwork structure for supporting a sheet of glass incidental to heat treatment thereof, a polygonal frame normally disposed in a horizontal position, and a plurality of upright wires secured upon the sides and ends of the frame in spaced relation to one another, said wires having spaced upper angular extensions defining as a group a curved contour corresponding substantially to the marginal shape of the sheet of glass and adapted to support a sheet of glass conforming to the curvature defined by said extensions.

2. A glass supporting structure comprising a polygonal frame normally disposed in a horizontal position, and a plurality of upright wires secured upon the sides and ends of the frame in spaced relation to one another, said wires having spaced upper angular extensions defining a curved contour and adapted to support a sheet of glass conforming to the curvature defined by said extensions, and non-combustible cord material trained alternately and continuously around the frame and around the angular extensions to insulate the supported glass from direct contact with the wires.

3. A glass supporting structure comprising an outer polygonal frame and inner polygonal frame, both normally disposed in a horizontal position, horizontal braces rigidly connecting the outer and inner frames to form a unitary structure, a plurality of straps secured around the sides and ends of the inner frame and including clamping means, and a plurality of upright wires disposed about the sides and ends of the inner frame and clamped by said means in said straps, said wires having spaced upper angular sections defining a curved contour and adapted to support sheet glass conforming to the curvature defined by said sections.

4. A glass supporting structure comprising a polygonal frame normally disposed in a horizontal position, a plurality of straps secured around the sides and ends of the frame and including clamping means, a plurality of upright interchangeable wires having lower end portions interchangeably clamped in the straps by said means, said wires having upper angular sections defining a curved contour adapted to support curved sheet glass conforming to the curvature defined by said sections.

5. A glass supporting structure comprising a polygonal frame normally disposed in a horizontal position, a plurality of straps secured around the sides and ends of the frame and including clamping means, a plurality of upright interchangeable wires interchangeably clamped at their lower end portions in the straps by said means, said wires having upper angular sections defining a curved contour and adapted to support curved sheet glass conforming to the curvature defined by said sections, and non-combustible cord material trained around the frame and extending continuously to and from the angular sections in looped relation about the latter to insulate the supported glass from direct contact with the wires.

6. A glass supporting structure comprising an outer polygonal frame and inner polygonal frame, both normally disposed in a horizontal position, horizontal braces rigidly connecting the outer and inner frames to form a unitary structure, a plurality of straps secured around the sides and ends of the inner frame and including clamping means, a plurality of upright wires disposed about the sides and ends of the inner frame and clamped by said means in said straps, said wires having upper angular sections defining a curved contour and adapted to support sheet glass conforming to the curvature defined by said sections, and non-combustible cord material trained alternately and continuously around the frame and around the angular extensions to insulate the supported glass from direct contact with the wires.

7. A glass supporting structure comprising a polygonal frame normally disposed in a horizontal position, and a plurality of upright wires secured upon the sides and ends of the frame in spaced relation to one another, said wires having upper angular extensions defining as a group a curved contour and adapted to support a sheet of glass conforming to the curvature defined by said extensions, said wires also having sections bent from and back to the longitudinal wire axes to permit alteration of the overall length of the wires.

8. A glass supporting structure comprising a polygonal frame normally disposed in a horizontal position, a plurality of upright wires secured upon the sides and ends of the frame in spaced relation to one another, said wires having upper angular extensions defining as a group a curved contour and adapted to support a sheet of glass conforming to the curvature defined by said extensions, said wires also having laterally offset portions of substantially horseshoe shape to permit alteration of overall length of the wires.

9. A glass supporting structure comprising an inner polygonal frame, an outer polygonal frame normally disposed in a horizontal position and substantially surrounding the inner frame, opposite end portions of the inner frame being curved upwardly, a plurality of upright wires having lower end portions secured upon the sides and ends of the inner frame, said wires having upper end portions defining a predetermined contour conforming to the contour of a curved sheet of glass to be supported thereon.

GERALD Z. MINTON.